J. R. BLANTON.
BELT.
APPLICATION FILED MAR. 13, 1917.
1,260,307.
Patented Mar. 26, 1918.
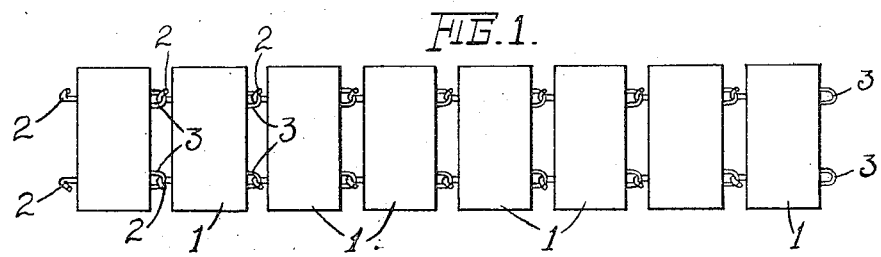
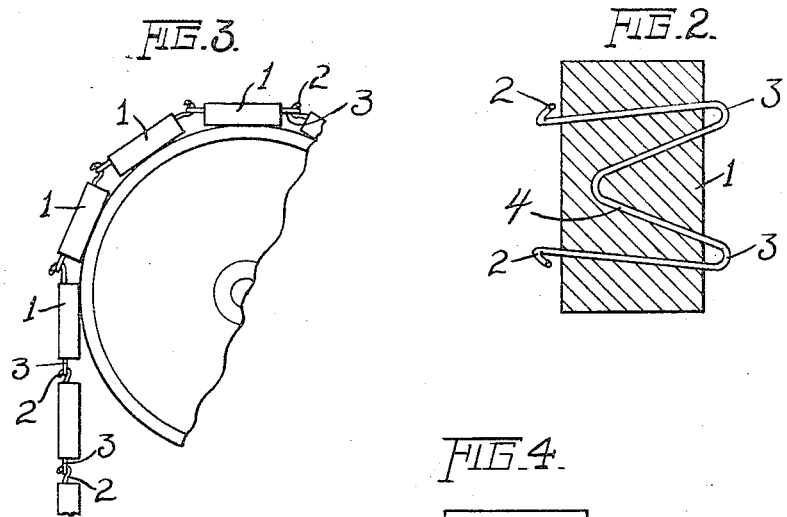
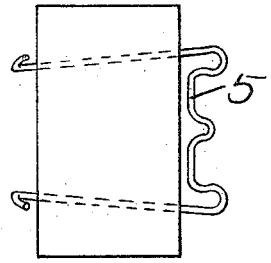

UNITED STATES PATENT OFFICE.

JOHN R. BLANTON, OF FORT WORTH, TEXAS.

BELT.

1,260,307. Specification of Letters Patent. Patented Mar. 26, 1918.

Application filed March 13, 1917. Serial No. 154,483.

*To all whom it may concern:*

Be it known that I, JOHN R. BLANTON, a citizen of the United States, residing at Fort Worth, in the county of Tarrant and State of Texas, have invented certain new and useful Improvements in Belts, of which the following is a specification.

My invention relates to belt construction and particularly to construction of fan belts for motor vehicles, and the object is to provide a belt which is simple in construction and which will be durable and strong, which will maintain the desired tension at all times and which will have a resilient engagement with the wheels without wear on the wheels or pulleys. Another object is to provide belts at small expense which are composed of units so that the length can be easily and readily adjusted. Other objects and advantages will be fully explained in the following description and more particularly pointed out in the claims.

Reference is had to the accompanying drawings which form a part of this application.

Figure 1 is a plan view of a portion of a belt embodying the improvement. Fig. 2 is a horizontal section of one or the rubber blocks, showing the spring connecting and securing device embedded therein. Fig. 3 is a side elevation of one of the rubber blocks, showing relative position of the spring connecting device to the fan pulley. Fig. 4 illustrates a variation in the spring connection.

Similar characters of reference are used to indicate the same parts throughout the several views.

The improved belt comprises blocks 1, preferably of rubber of a suitable consistency, but leather or other material may be used. Each block embeds a spring securing or connecting device which is bent to form hooks 2 and eyes 3. The eyes 3 will be engaged by the hooks 2 of the adjacent block 1. The spring is bent to form a stay member 4 which is embedded in the block 1. This will add strength to the block without destroying the resiliency thereof. The stay member 4 will prevent the securing device from being drawn out of the block, the securing member is placed in the block 1 nearer to the outside of the block relative to the fan pulley so that the greater or tread portion of the block will be next to the fan pulley. This will secure the desired resiliency of the block and prevent the possibility of the hooks 2 and eyes 3 striking the fan pulleys. The variation shown in Fig. 4 may be of rubber or leather, the variation being in the construction of the spring 5.

The stay member 4 is embedded in the block of rubber by placing raw rubber in two half molds. The stay is placed in one of the half molds and pressed down into notches in the mold. The other half mold has notches in the sides corresponding to the notches in the other half mold. After the rubber and the stay are adjusted in the half molds, the two half molds are then pressed well together, telepscoping together and the stay member 4 projecting through the sides of the mold. The mold is then placed in an oven for curing.

What I claim, is,—

1. A belt comprising a series of resilient and flexible blocks and a spring connecting member embedded in each block and having eyes which project from one end of the block and hooks projecting from the other end of the block, the hooks on one block engaging the eyes of the adjacent block.

2. A belt comprising a series of resilient and flexible blocks and a spring connecting member embedded in each block, said connecting member having hooks projecting from one end of the block and eyes projecting from the other end of the block and a stay embedded in the block, the hooks of one block engaging the eyes of the adjacent block.

3. A belt comprising a series of flexible blocks and a spring connecting member embedded in each block and having hooks projecting from one end of the block and eyes projecting from the other end of the block, the hooks of one block engaging the eyes of the adjacent block.

4. A belt comprising a series of resilient blocks and a spring connecting member embedded in each block and having hooks projecting from one end of the block and eyes projecting from the other end of the block and a stay member embedded in the block, said connecting member being embedded in the block nearer the outer face of the block, leaving the greater portion of the block on the tread side, the hooks of one block engaging the eyes of the adjacent block.

In testimony whereof, I set my hand, this 8th day of March, 1917.

JOHN R. BLANTON.